Dec. 16, 1941.  A. W. BIRD  2,265,981

SPEED RESPONSIVE COUPLING

Filed Sept. 5, 1939  2 Sheets—Sheet 1

Inventor
A. W. Bird
By: Glascoch Downing Seidell
Attys.

Dec. 16, 1941.            A. W. BIRD              2,265,981
                    SPEED RESPONSIVE COUPLING
              Filed Sept. 5, 1939         2 Sheets-Sheet 2

Inventor,
A. W. Bird
By: Glascock Downing & Seebold
Attys.

Patented Dec. 16, 1941

2,265,981

UNITED STATES PATENT OFFICE 2,265,981

SPEED RESPONSIVE COUPLING

Arthur William Bird, Birmingham, England, assignor of one-half to Henry Meadows Limited, Wolverhampton, England Application September 5, 1939, Serial No. 293,504

1 Claim. (Cl. 64—25)

This invention has for its object to provide improved means for automatically varying the timing of fuel injection pumps for internal combustion engines of the compression ignition type, the means being of the kind in which centrifugal masses in the form of rollers are arranged between relatively inclined surfaces or parts connected respectively with driving and driven members, the latter being controlled by springs.

In such means it is necessary to employ strong springs to hold the relatively inclined surfaces in contact with the centrifugal masses under all working conditions of the engine, and since the centrifugal masses are relatively light it is necessary that the angles included by the surfaces in contact with the said masses shall be small, especially at the positions occupied by the masses when the mechanism is at rest or is rotating slowly. A consequence of this condition is that to secure maximum sensitiveness of the mechanism it is necessary to reduce to a minimum the frictional resistance to movements of the centrifugal masses. The object of the present invention is to provide an improved mechanism which enables this condition to be satisfied in a simple and convenient manner.

The invention comprises the combination of relatively movable driving and driven members having a plurality of pairs of relatively inclined surfaces, controlling springs associated with the said members, and a centrifugal mass located between each pair of relatively inclined surfaces, each such mass consisting of at least a pair of independently rotatable rollers, one of which makes contact with one of the said surfaces and the other with the other surface.

In the accompanying sheets of explanatory drawings.

Figure 1:
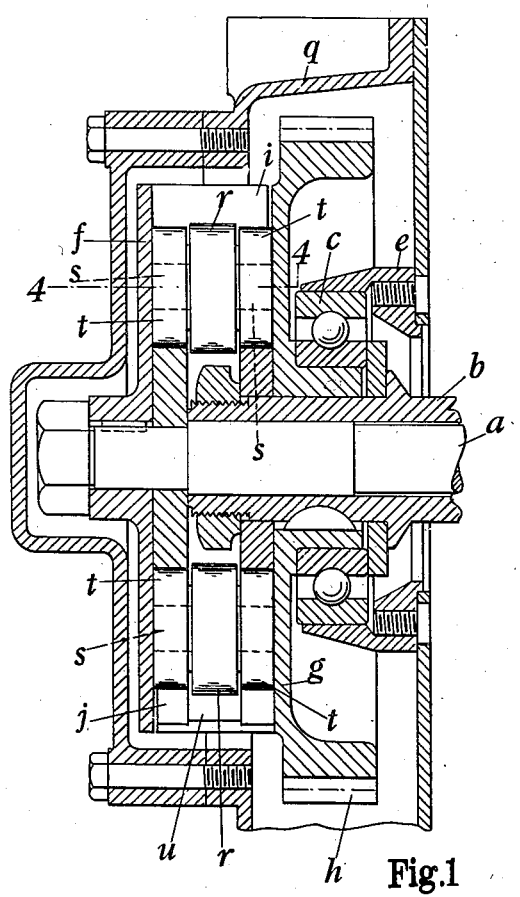
Figure 1 is a sectional side elevation, Figure 2 a sectional end elevation, and Figure 3 a side elevation of a mechanism constructed in accordance with the invention.
Figure 3:
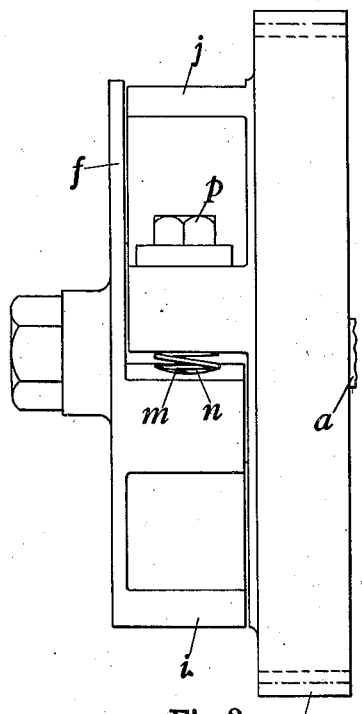
Figure 4:
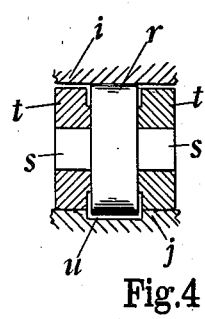
Figure 4 is a fragmentary sectional view taken on the line 4—4 of Figure 1 and illustrating one of the centrifugal masses and its associated surfaces on the driving and driven members.

In carrying the invention into effect as shown in Figures 1 to 4, I employ for imparting motion to the fuel injection pump a rotary driven shaft $a$ which is arranged within and supported by a rotary hollow driving shaft $b$, the latter being mounted in a ball bearing $c$, on a fixed support $e$. At their adjacent ends the shafts $a$, $b$ are respectively provided with flanges $f$, $g$ which are spaced apart and which (in the example shown), have the form of plates secured on the corresponding shafts, the outer periphery of the flange $g$ on the hollow shaft $b$ being formed with an externally toothed rim $h$ for engagement by a driving chain or gear wheel (not shown) adapted to receive motion from the engine. On their adjacent faces the flanges $f$, $g$ are each formed or provided with a pair of similar projections which are situated on opposite sides of the axis of rotation, the projections on the flange $f$ being indicated by $i$ and being arranged to lie between those on the flange $g$ which are indicated by $j$. Between adjacent and relatively inclined faces of the projections $i$, $j$ and on opposite sides of the axis of rotation I arrange a pair of centrifugal masses in the form of rollers to be hereinafter described. Also I combine with the mechanism suitable controlling springs. In the example shown strong compression springs $m$ are each housed at one end in a cylindrical recess $n$ formed in the corresponding projection $i$, and at the other end in a cylindrical aperture $o$ formed in the corresponding projection $j$, the latter end of the spring abutting against a plug $p$ screwed into and closing the outer end of the aperture $o$.

The centrifugal masses serve by their interaction with the relatively inclined faces of the projections $i$, $j$, to transmit motion from the flange $g$ through the flange $f$ to the shaft $a$. The said faces of the projections $i$, $j$ acted on by the centrifugal masses are shaped so that radial movements of the said masses cause or allow these faces to move away from or towards each other, thus causing the required relative angular movements of the driving and driven members $g$, $a$. For this purpose in the example shown, the appropriate faces of the projections $i$ are made to a concave form and those of the projections $j$ are flat. But in any case the relative inclination of the faces is such as to give the required relationship between speed and angular displacement. Further the faces are such that relatively light centrifugal masses serve to effect the required angular movements, and variations of torque have little or no effect on the radial positions of the said masses. The flanges $f$, $g$ are enclosed by a casing $q$ attached to the support $e$.

To minimise frictional resistance to movements of the centrifugal masses relatively to the abutment surfaces between which they are arranged, I construct each mass from at least a pair of separate coaxial and independently rotatable rollers. In the example shown in Figures 1-4 of the drawings I employ a roller $r$ having end trunnions $s$ on which are freely mounted two other rollers $t$ situated at opposite sides of the roller $r$. The roller $r$ is made of slightly greater diameter than the rollers $t$ (which are equal to each other in diameter) and is arranged to roll on the concave surface of the adjacent part $i$. The other rollers $t$ are arranged to roll on the straight track surface of the adjacent part $j$, and the latter is formed with a longitudinal channel $u$ along which the roller $r$ can move without making contact with the part $j$.

When as heretofore a single roller has been arranged in contact with both parts as $i, j$, pure rolling of the roller on both surfaces cannot be obtained. If the roller rolls on one of the surfaces it must slide on the other, and so introduce undesirable friction. By the arrangement of rollers above described pure rolling contact is obtained at both surfaces and friction is thus minimised, with the result that an important improvement is obtained in the sensitiveness of the mechanism in response to the centrifugal action of the masses constituted by the rollers.

Figure 5:
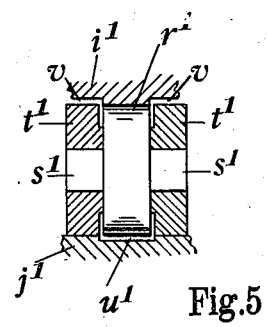
Figures 5, 6 and 7 are views similar to Figure 4 illustrating modified forms of the centrifugal masses and their co-acting surfaces.
Figure 6:
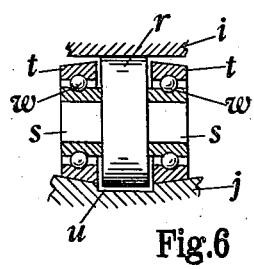
Figure 7:
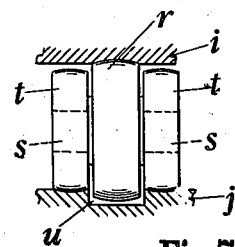
Figure 2:
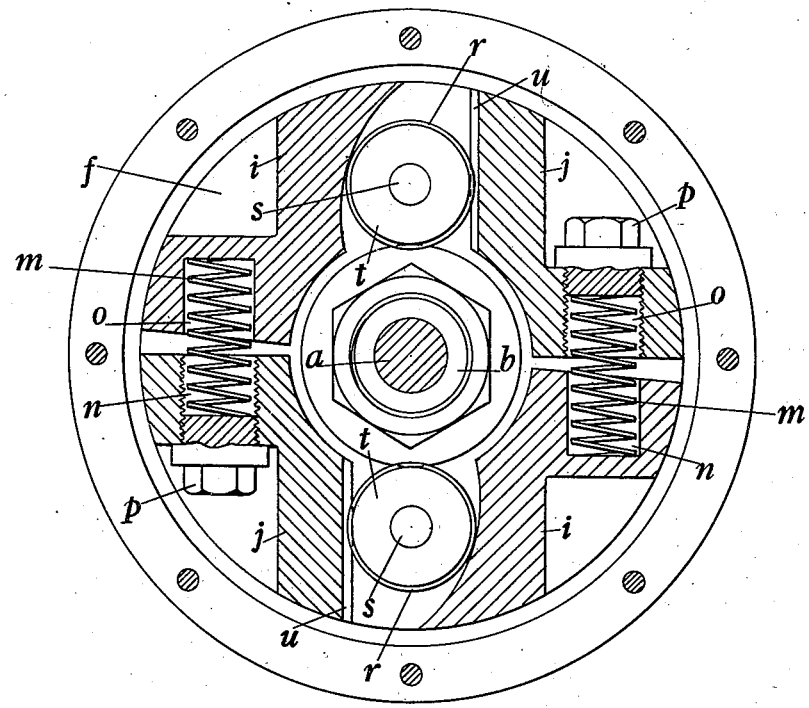

The invention is not limited to the example above described as the mode of constructing the centrifugal masses so as to obtain pure rolling along each of the associated and relatively inclined pairs of surfaces may be modified, provided always that each centrifugal mass shall consist of at least two relatively rotatable parts, one of which can roll on one of the inclined surfaces and the other on the other surface. For example the three rollers forming each centrifugal mass may be of the same diameter as shown in Figure 5 in which the parts analogous to those shown in Figures 1 to 4 are indicated by the same reference letters primed. In this example the part $j^1$ is formed with a channel $u^1$ for preventing contact between this part and the roller $r^1$, and the part $i^1$ is formed with recesses $v$ for preventing contact between this part and the rollers $t^1$. In another alternative one of the rollers $t$ or $t^1$ of either of the examples above described may be omitted, but it is preferred to employ a pair of these rollers as shown. When it is desired to make provision for eliminating axial freedom of the rollers I may employ either of the constructions shown in Figure 6 or 7. The construction shown in Figure 6 is essentially the same as that shown in Figure 4 and differs only in that the rollers $t$ are made of opposed frustro-conical form and are mounted on ball or roller bearings $w$, the part $j$ being provided with complementary track surfaces. The construction shown in Figure 7 is also essentially the same as that shown in Figure 4, and differs only in that the rollers are formed with spherical peripheral surfaces, and that the parts $i, j$ are formed with complementary track surfaces.

Having thus described my invention what I claim as new and desire to secure by Letters Patent is:

Means for automatically varying the timing of fuel injection pumps for internal combustion engines, comprising the combination of a pair of coaxially arranged (driving and driven) members, a plurality of projections on each of the said members, the projections on the one member lying between those on the other, controlling springs situated between some of the adjacent pairs of faces of the projections, and centrifugal masses situated between the other pairs of adjacent faces of the projections and each centrifugal mass comprising three co-axial and independently rotatable rollers the outer two rollers of which are of opposed frustro-conical form while the surface with which they co-operate is correspondingly shaped.

ARTHUR WILLIAM BIRD.